United States Patent
Amano et al.

[11] Patent Number: 6,105,708
[45] Date of Patent: Aug. 22, 2000

[54] PIPING DEVICE IN ATMOSPHERIC SIDE OF CANISTER FOR VEHICLE

[75] Inventors: Atsushi Amano; Kazuo Sugiyama, both of Shizuoka-ken, Japan

[73] Assignee: Suzuki Motor Corporation, Shizuoka-ken, Japan

[21] Appl. No.: 09/129,806

[22] Filed: Aug. 6, 1998

[30] Foreign Application Priority Data

Aug. 8, 1997 [JP] Japan .................................... 9-227539
Aug. 8, 1997 [JP] Japan .................................... 9-227542

[51] Int. Cl.⁷ .................................................. B60K 13/04
[52] U.S. Cl. ............................................................. 180/309
[58] Field of Search ...................... 123/520, 516, 123/541, 518, 519; 180/69.4; 280/834, 835

[56] References Cited

U.S. PATENT DOCUMENTS

| | | | |
|---|---|---|---|
| 3,913,545 | 10/1975 | Haase et al. | 123/136 |
| 4,677,956 | 7/1987 | Hamburg | 123/520 |
| 5,058,693 | 10/1991 | Murdock et al. | 180/69.4 |
| 5,427,076 | 6/1995 | Kobayashi et al. | 123/520 |
| 5,592,922 | 1/1997 | Denz | 123/520 |
| 5,687,697 | 11/1997 | Ishikawa | 123/520 |
| 5,702,125 | 12/1997 | Nakajima et al. | |
| 5,806,500 | 9/1998 | Fargo et al. | 123/520 |
| 5,855,198 | 1/1999 | Nakajima et al. | 123/520 |

FOREIGN PATENT DOCUMENTS

| | | | |
|---|---|---|---|
| 62-258813 | 11/1987 | Japan | 280/834 |
| 8-58404 | 3/1996 | Japan . | |
| 9-14060 | 1/1997 | Japan . | |
| 1316161 | 5/1973 | United Kingdom | 123/519 |
| 2246988 | 2/1992 | United Kingdom | 280/834 |

Primary Examiner—Paul N. Dickson
Assistant Examiner—M B Klebe
Attorney, Agent, or Firm—Flynn, Thiel, Boutell & Tanis, P.C.

[57] ABSTRACT

A fuel tank and a canister for absorbing evaporated fuel from the fuel tank are provided in the rear side of a vehicle, and an air suction filter for removing dust in air to be introduced to an air suction pipe member connected to the canister is provided further rearward on the vehicle than the fuel tank.

14 Claims, 8 Drawing Sheets

PIPING DEVICE IN ATMOSPHERIC SIDE OF CANISTER FOR VEHICLE

FIELD OF THE INVENTION

The present invention relates to a piping device in the atmospheric side of a canister for a vehicle and, more particularly, to a piping device in the atmospheric side of a canister for a vehicle in which an air suction pipe member can be made shorter, an air suction filter can be detachably provided as a single component, and absorption of dust into the canister can be minimized.

The present invention also relates to an evaporated-fuel collecting apparatus mounting structure and, more particularly, to an evaporated-fuel collecting apparatus mounting structure which reduces time, steps, and number of components required for assembling the apparatus, enhances purge capability of a canister, makes more efficient use of space in a vehicle, and easily sets a direction of a connecting union for a valve.

BACKGROUND OF THE INVENTION

In a vehicle, right and left side frame members are provided at both sides of the vehicle in the longitudinal direction thereof, and cross frame members extend in the lateral direction of the vehicle and connect the right and left side members to one another are provided at front and rear sides (i.e. ends) of the vehicle. In some types of vehicles, an evaporation system having a canister is provided together with a fuel tank.

In this evaporation system, a canister is provided in between an evaporated fuel pipe in which an evaporated fuel passage communicating with the fuel tank is formed and a purge pipe in which a purge passage communicating with an air intake system of an engine is formed, and a purge valve for opening and closing the purge passage in response to an operating state of the engine to control a rate of introduction of evaporated fuel into the air intake system is provided at a point in the purge pipe. The canister accommodates therein an absorbent such as activated carbon, absorbs evaporated fuel in a fuel tank by means of the absorbent when the engine is stopped, purges the absorbed evaporated fuel by means of atmospheric air introduced thereinto when the engine is operating, and supplies the fuel to the engine. The air provided to the canister is introduced from an air suction pipe member comprising a hose connected to the atmospheric side of the canister.

Such an evaporation system is disclosed, for example, in Japanese Patent Laid-Open Publication No. 09014060A (1997). According to this publication, by providing an air hose which is an air suction pipe member with one end thereof connected to a bottom of the canister and the other end thereof inclined downwardly to reach the side of the vehicle body frame, deposition of water in the air hose is prevented.

In the conventional type of evaporation system, however, when fuel is supplied to a fuel tank, the air in a canister pushed by evaporated fuel from the fuel tank is rapidly introduced to the atmospheric side of the canister, so that the distance from the canister to an inlet/outlet port at the end of the air suction pipe member should preferably be made shorter because air flow resistance within the air suction pipe member becomes smaller, but no attention has been paid to this point in the conventional technology. For this reason the length of the air suction pipe member is normally long, and the flow resistance is disadvantageously great.

In addition, when the canister purges and supplies a large quantity of evaporated fuel to the engine, a large quantity of air is introduced from the air suction pipe member into the canister, and a large amount of dust is disadvantageously introduced into the canister together with the air.

Further, when the inlet/outlet port in the atmospheric side of the air suction pipe member is provided around in the vicinity of the fuel tank adjacent the rear side of the vehicle, the inlet/outlet port is located at a position closer to the ground than the engine compartment or the like so, that the quantity of dust introduced into the canister increases.

Further, on some vehicles provided with an internal combustion engine, an evaporated-fuel collecting apparatus is provided for the purpose of preventing leakage of evaporated-fuel generated in the fuel tank to the outside. The evaporated-fuel collecting apparatus has a canister provided therein for collecting evaporated-fuel generated in a fuel tank, absorbing and maintaining the fuel, purging the absorbed and maintained evaporated fuel when the internal combustion engine is operating, and supplying the fuel to an air intake passage for the internal combustion engine.

The evaporated-fuel collecting apparatus also has a valve provided therein for opening or closing the interior of the canister to the outside air. Opening of the valve permits communication between the interior of the canister and the outside air for the purpose of purging the evaporated fuel absorbed by the canister and supplying the fuel to an air intake passage through a purge passage, and closing of the valve prevents communication between the interior of the canister and the outside air when checking for any leakage of the fuel to an evaporating passage.

An example of this type of evaporated-fuel collecting apparatus is disclosed in Japanese Patent Laid-Open Publication No. 08058404A (1996). This Publication discloses a vehicle having a rear floor panel provided at the rear side of a connecting wall standing upward at the rear edge of a front floor panel, and a fuel tank is supported adjacent the lower side of the rear floor panel. A canister is located in a section between the rear face of the connecting wall and the front face of the fuel tank.

In the conventional type of evaporated-fuel collecting apparatus, however, when a canister for collecting evaporated-fuel in the fuel tank is to be mounted on the body of the vehicle, the fuel tank and the canister are discretely or individually mounted on the body as separate components, and the fuel tank and the canister are then connected to one another by a hose. As such, in the conventional type of evaporated-fuel collecting apparatus, time, steps, and a number of components required for assembling the components to the body of the vehicle tend to increase.

Also, since the canister is located near the fuel tank in the rear side of the body of the vehicle, an absorbent such as activated carbon inside the canister is easily effected by the outside air temperature. For this reason, when the outside air temperature is low or the canister is cooled by wind or air flow during driving of the vehicle, the temperature of the absorbent in the canister is lowered, which reduces purge capability.

Further, in the conventional type of evaporated-fuel collecting apparatus, when a valve for communicating or cutting off the interior of a canister to or from the air is to be mounted on the body of the vehicle, the canister and the valve are discretely or individually mounted on the body as separate components, and the canister and the valve are then connected to one another by a hose. For this reason, in the conventional type of evaporated-fuel collecting apparatus, time, steps, and a number of components required for assembling the components to the body of the vehicle tend to increase. Further, the canister and the valve are separately assembled, which results in inefficient use of space within the vehicle.

SUMMARY OF THE INVENTION

In order to minimize the above-discussed inconveniences, the present invention provides a piping device at the atmospheric side of a canister for a vehicle which includes side frame members provided in a longitudinal direction of the vehicle; a rear cross frame member provided in the lateral direction thereof and connected to the side members; a fuel tank; a canister for absorbing evaporated fuel generated in the fuel tank, for purging the absorbed evaporated fuel by introducing the air thereinto, and for supplying the fuel to an engine; and an air suction pipe member connected to the atmospheric side of the canister. The fuel tank and canister are provided in the rear side of the vehicle, and an air suction filter for removing dust in the air to be introduced into the air suction pipe member is provided further rearward on the vehicle than the fuel tank.

Thus, it is possible to make the air suction pipe member shorter, to reduce flow resistance within the pipe member generated when fuel is supplied to the fuel tank, to provide the air suction filter as a single detachable component, and further to reduce or minimize absorption of dust into the canister.

Further, in order to minimize the other inconveniences described above, a canister is provided for collecting evaporated-fuel generated in a fuel tank mounted on a vehicle, absorbing and maintaining the fuel, purging the absorbed and maintained evaporated fuel when an internal combustion engine is operating, and supplying the fuel to an air intake passage for the internal combustion engine. This canister is mounted on the fuel tank to be mounted on the body of the vehicle.

More specifically, the canister is mounted on the top surface of the fuel tank so that the canister is located at a position close to an exhaust pipe for the internal combustion engine when the fuel tank is mounted on the body of the vehicle. Also, a valve is positioned and mounted on the canister by means of a stop section and a valve mounting bolt.

In the evaporated-fuel collecting apparatus mounting structure according to the present invention, a canister is mounted on a fuel tank, and the fuel tank with the canister mounted thereon can be mounted on the body of the vehicle as a unit. For this reason it is unnecessary to discretely or individually mount the fuel tank and canister on the body of the vehicle as separate components.

The canister is mounted on the top surface of the fuel tank so that the canister is located at a position close to an exhaust pipe for an internal combustion engine when the fuel tank has been mounted on the body of the vehicle, and can collect evaporated fuel generated in the fuel tank during supply of fuel when the vehicle is stationary, absorb and maintain the fuel, and also can easily purge the evaporated fuel by being warmed with heat of the exhaust pipe during driving of the vehicle when the internal combustion engine is operating.

Further, a valve is positioned in and mounted on the canister and includes a stop section and a valve mounting bolt, so that the canister with the valve mounted thereon can be mounted on the fuel tank as a unit. For this reason it is unnecessary to discretely mount the canister and valve on the body of the vehicle as separate components. In addition, the valve can be mounted on the canister so that a connecting union or sleeve of the valve is oriented in the proper direction.

BRIEF DESCRIPTION OF THE DRAWINGS

Detailed and specific description is made hereinafter for embodiments of the present invention with reference to the related drawings, in which.

DETAILED DESCRIPTION

Figure 1:
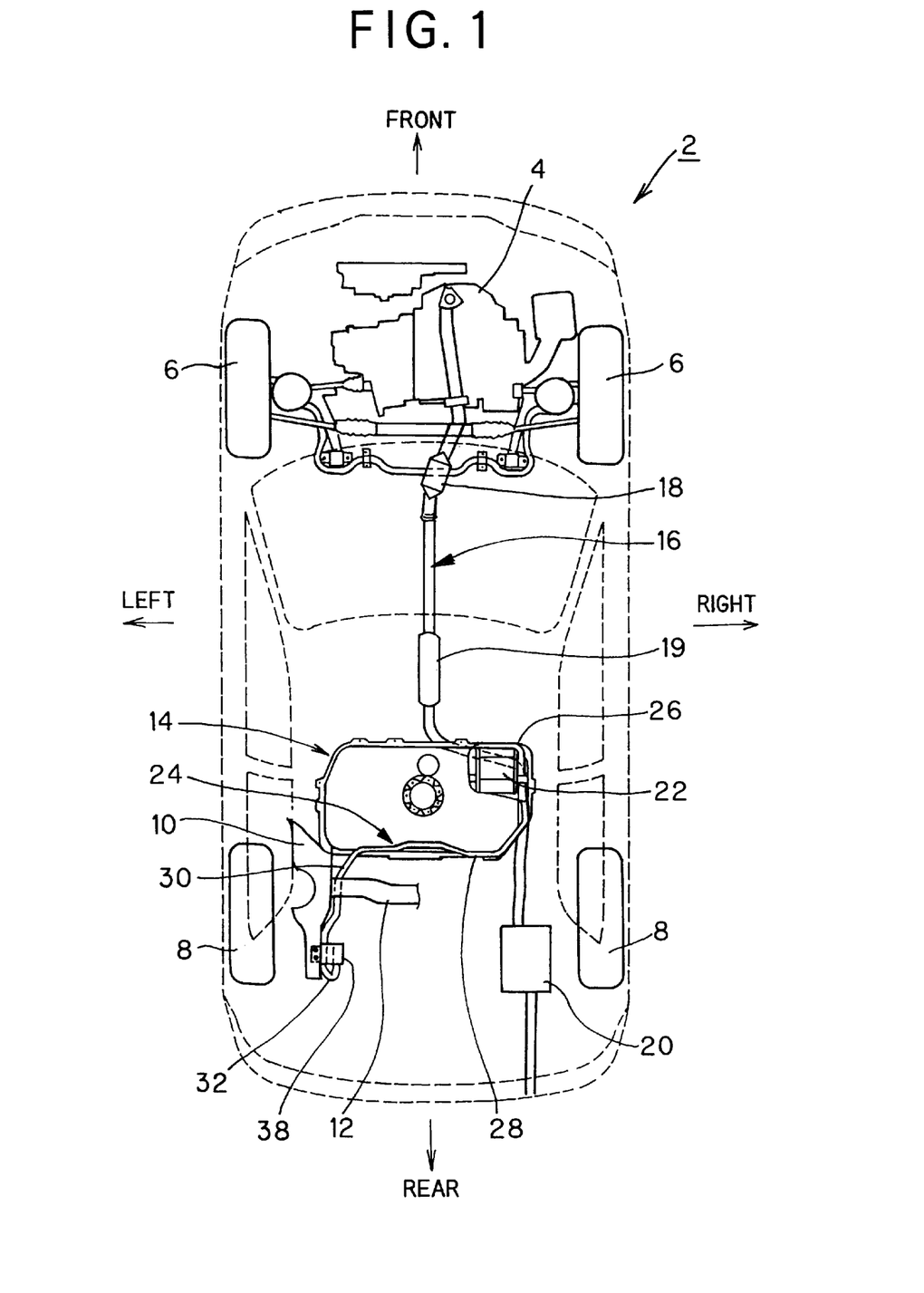
FIG. 1 is a plan view of a vehicle.

FIGS. 1–4 show an embodiment of the present invention. In FIG. 1, reference numeral 2 designates a vehicle, 4 designates an engine mounted in a front side of the vehicle, 6 designates a pair of front wheels, and 8 designates a pair of rear wheels.

Figure 4:
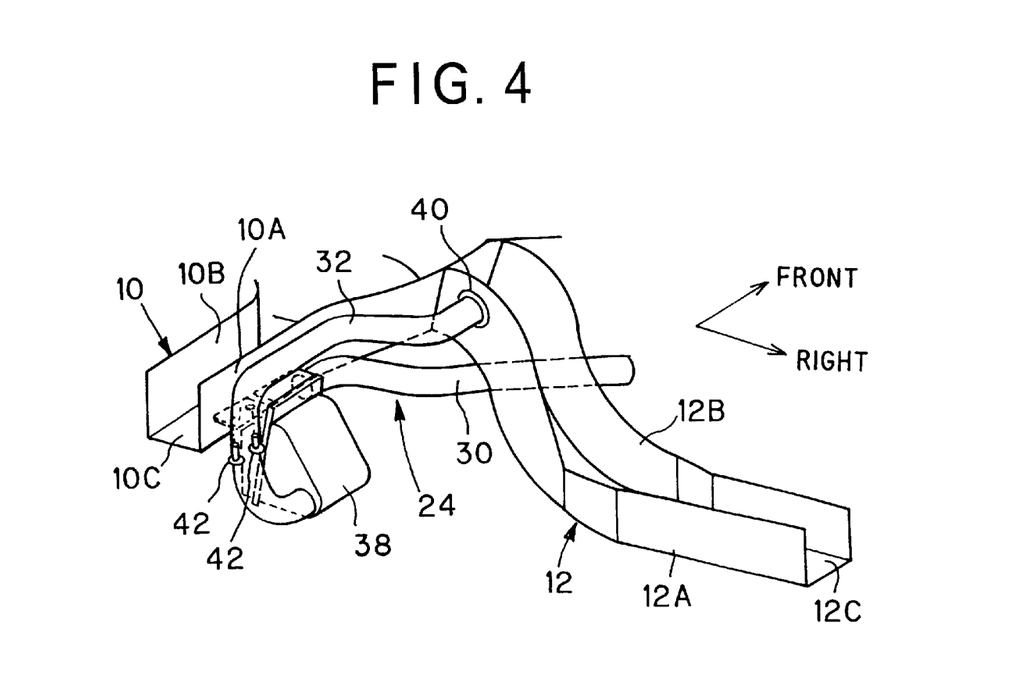
FIG. 4 is a perspective view adjacent the air suction pipe member in FIG. 2.

The vehicle 2 has a pair of side frame members 10 each extending in the longitudinal direction of the vehicle 2 and being provided adjacent opposite sides thereof, and cross frame members 12 each extending in the lateral direction of the vehicle 2 adjoining the right and left side members at the front and rear sections of the vehicle 2 (only one of which cross-members 12 is shown here). Each of the side frame members 10 and the rear cross frame member 12 has a U-shaped cross section which opens upwardly as shown in FIG. 4. More specifically, the side members 10 have a pair of parallel and generally vertically disposed side walls 10A and 10B which are interconnected by a generally horizontally disposed bottom wall 10C. Likewise, the cross member 12 includes a pair of parallel and generally vertically oriented side walls 12A and 12B which are interconnected by a generally horizontally oriented bottom wall 12C.

Also, the vehicle 2 has a fuel tank 14 located in the rear section thereof.

Connected to the engine 4 is a forward end of an exhaust pipe 16 of an exhaust system. This exhaust pipe 16 extends rearwardly from the engine 4 in the longitudinal direction of the vehicle 2 (i.e. the direction of movement) generally along a central longitudinal axis of the vehicle 2. The rearward end of the exhaust pipe 16 traverses this axis and bends toward the right side of the vehicle 2 and extends along the lower side as well as the front side face of the fuel tank 14, further extends toward the rear side of the vehicle 2 along the right side face of the fuel tank 14, and terminates at the rear end of the vehicle.

The exhaust pipe 16 has a catalytic converter 18 and a sub-chamber 19 each provided toward the front side of the vehicle 2 forwardly from the fuel tank 14, and a muffler 20 is provided at the rear side of the vehicle 2 rearwardly from the fuel tank 14.

A canister 22 is integrally fixed to an upper, front, and right-side corner section of the fuel tank 14. The canister 22 accommodates therein an absorbent which absorbs evaporated fuel generated in the fuel tank 14 when the engine 4 is stopped, purges the absorbed evaporated fuel by means of the introduction of air thereinto when the engine 4 is operating, and supplies the fuel to the engine 4. A conventional purge hose (not shown) connects the canister to the engine.

Connected to the atmospheric side of this canister 22 is an air suction pipe member 24 for introducing air into canister 22.

The air suction pipe member 24 (FIG. 2) includes a first air suction hose 26 made of an elastic member, an air suction pipe 28 made of a metallic member, a second air suction hose 30 made of an elastic member, and a third air suction hose 32 made of an elastic member.

Figure 2:
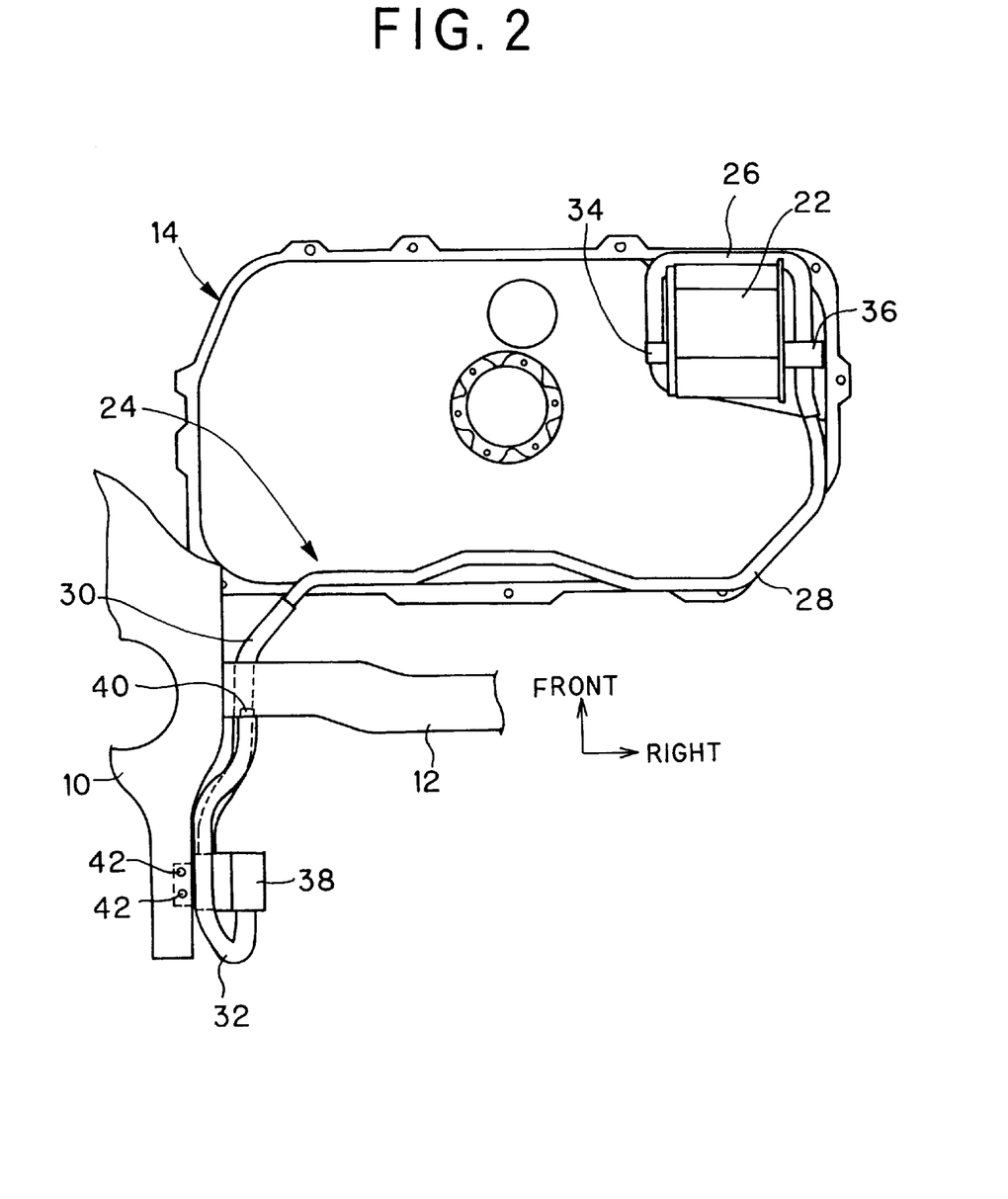
FIG. 2 is an enlarged plan view of a key section adjacent the air suction pipe member shown in FIG. 1.
Figure 3:
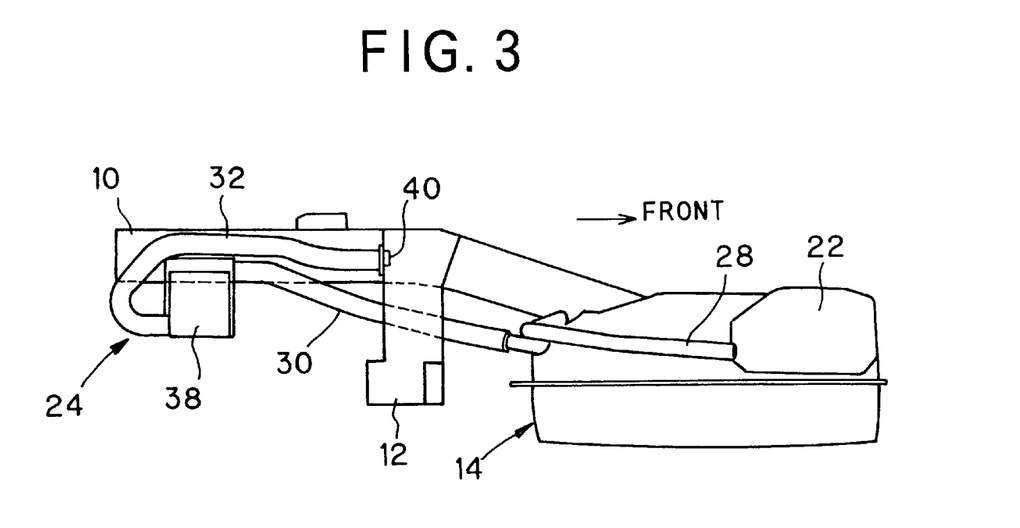
FIG. 3 is a side view adjacent the air suction pipe member in FIG. 2.

One end of the first air suction hose 26 is connected to a hose connecting section 34 on the left side face of the canister 22. The first air suction hose 26 is generally U-shaped and is disposed so that the U shape opens toward the rear of the vehicle 2 and extends along the left, front, and right side faces of the canister 22. The other end of the first air suction hose 26 points toward the rear of the vehicle 2 and is fixed to a hose fixing body (i.e. a valve) 36 which is fixed to the right side face of the canister 22.

One end of the air suction pipe 28 is connected to said other end of the first air suction hose 26, and extends along the right side face, the rear side face and the upper side of the fuel tank 14. The other end of the air suction pipe 28 is located adjacent the left rear side corner section of the fuel tank 14. The air suction pipe 28 is fixed to the rear upper side of the fuel tank 14 by a plurality of pipe fixing bodies or mounting brackets (not shown).

One end of the second air suction hose 30 is connected to said other end of the air suction pipe 28. The air suction hose 30 extends rearwardly along an inwardly facing surface of side wall 10A (FIG. 4) of the left side frame member 10 and is sidewardly spaced apart from the exhaust pipe 16 at a position rearwardly of the fuel tank 14. The other end of the second air suction hose 30 is connected to an air suction filter 38.

One end of the third air suction hose 32 is connected to the air suction filter 38 at an opposite side thereof from the second air suction hose 30, and the hose 32 extends along the inwardly facing surface of side wall 10A of left side member 10 in the forward direction of the vehicle 2, namely above the second suction hose 30. The other end of the third suction hose 32 is connected to a connector 40 which constitutes an inlet/outlet port at the atmospheric side of the third suction hose 32, which connector 40 is fixed to a rearwardly facing surface of rear side wall 12A of the frame cross member 12 at a position close to the intersection between the side member 10 and cross member 12. Accordingly, air is introduced from the interior cross member 12 through the connector 40 and into the hose 32 of the air suction pipe member 24.

The air suction filter 38 is fixed to the side member 10 adjacent the inwardly facing surface of side wall 10A by fixing bolts 42 which extend into the bottom wall 10C of the side member 10 so that dust contained in the air supplied through the connector 40 is removed. The air suction filter 38 and the second and third air suction hoses 30 and 32 are provided along the side wall 10A of the left side member 10 and are thus spaced away from or remote from the exhaust system including the exhaust pipe 16 and muffler 20 which constitute a source of heat.

The operation and advantages of the arrangement of FIGS. 1–4 will now be briefly described.

The canister 22 absorbs evaporated fuel generated in the fuel tank 14 when the engine 4 is stopped, purges the absorbed evaporated fuel by air introduced thereinto when the engine 4 is operating, and supplies the evaporated fuel to the engine 4.

In addition, in this embodiment, the air suction filter 38, and the second and third air suction hoses 30 and 32 are located remotely from the exhaust system which is a heat source, so that the air suction filter 38 and the second and third air suction hoses 30, 32 are not affected by heat which can have an undesirable effect on the intended function of these components.

Further, the air suction filter 38 is fixed to the left side member 10 by the fixing bolts 42 and no other components interfere with the air suction filter 38 in this area. For this reason, the air suction filter 38 can be provided as a single detachable component, which makes it possible to easily attach or detach the filter 38.

Furthermore, the air suction filter 38 is located inside the left side member 10, and inwardly from the rear wheels 8, so that damage to the air suction filter 38 caused by stones or other road debris can be prevented.

Also, the air suction filter 38 is located at a position further rearwardly on the vehicle 2 as compared to the fuel tank 14, so that the entire length of the air suction pipe member 24 can be made shorter, and with this feature, even if the air in the canister 22 is rapidly introduced into the air suction pipe member 24 when fuel is supplied to the fuel tank 14, air flow resistance within the air suction pipe member 24 can be reduced.

Further, the connector 40 for the third air suction hose 32 is fixed to the cross member 12, so that there is no need to fix the connector 40 to the side member 10 which extends in the direction in which the vehicle 2 travels and thus a high dust flow rate occurs in this area, which minimizes introduction of dust into the canister 22 during absorption of air required for purging the evaporated fuel absorbed by the canister 22.

Furthermore, the third air suction hose 32 is fixed to the cross member 12 at a position close to the side member 10, so that entry of dust into the canister 22 can be minimized. This is because the connector 40 for the third suction hose 32 is located at a higher position on the cross member 12, which makes it difficult for dust deposits at the bottom of the cross member 12 to be introduced thereinto, and the cross member 12 has a large volume, which lowers the flow velocity of the air so that dust inside the cross member 12 is hardly disturbed, and further because the side member 10 is located right next to the third suction hose 32, which makes the flow velocity of the air slower.

Moreover, the air suction filter 38 has a function of preventing evaporated fuel from being released to the outside when evaporated fuel from the canister 22 is contained within the air suction pipe member 24.

In accordance with the present invention, the fuel tank and the canister are provided in the rear side of the vehicle, and the air suction filter for removing dust in the air to be introduced to the air suction pipe member is provided further rearwardly on the vehicle as compared to the fuel tank, so that the air suction pipe member can be made shorter, flow resistance between the air suction pipe member and the air from the canister can be reduced, the air suction filter can be detachably provided as a single component, and absorption of dust into the canister can be minimized.

A further embodiment of the present invention will now be described with reference to FIGS. 5–11.

Figure 5:
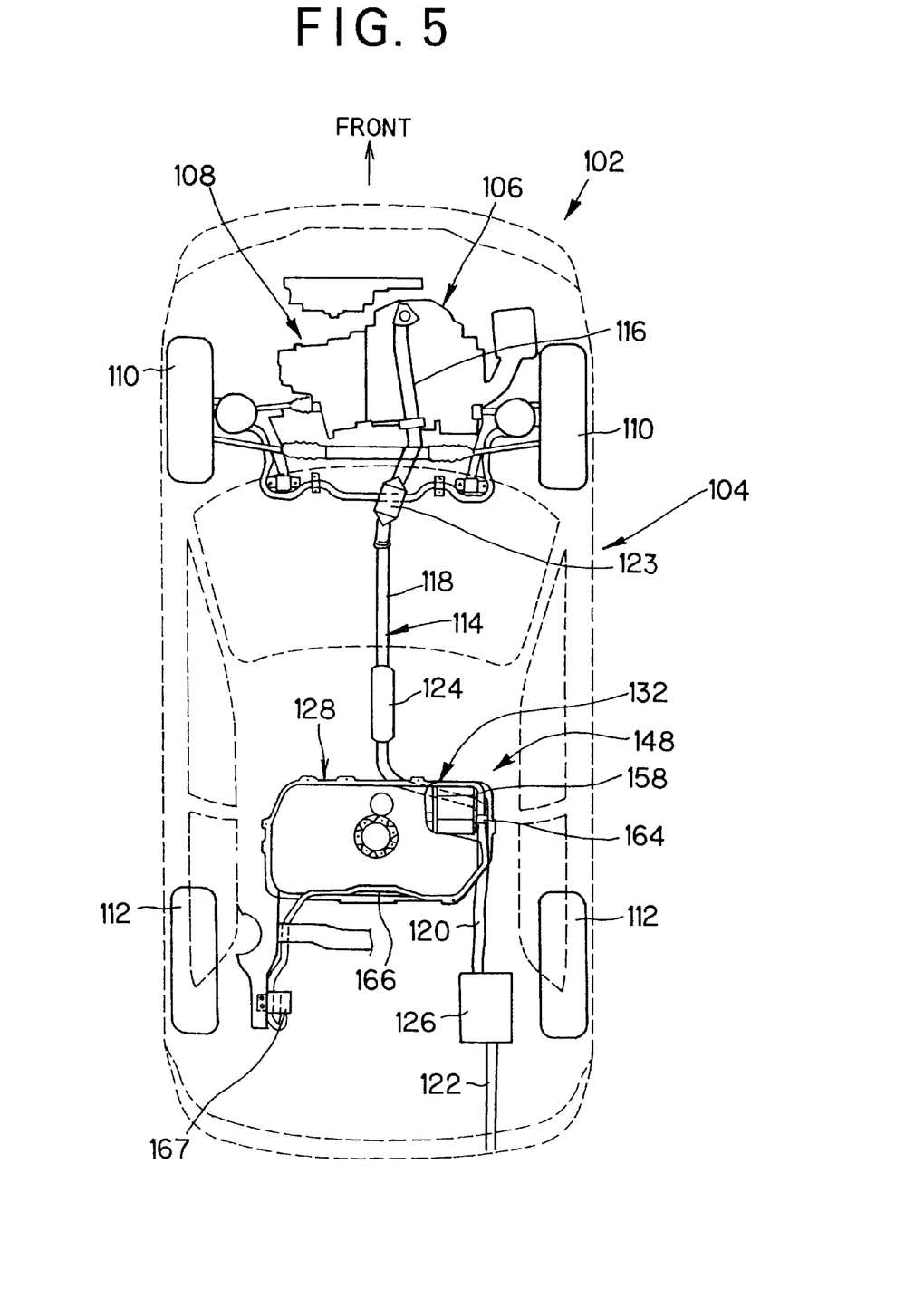
FIG. 5 is a plan view of a vehicle illustrating an evaporated-fuel collecting apparatus mounting structure in accordance with a further embodiment of the present invention.

In FIG. 5, the reference numeral 102 designates a vehicle, 104 designates a body of the vehicle 102, 106 designates an internal combustion engine, 108 designates a gearbox, 110 designates front wheels, and 112 designates rear wheels. The vehicle 102 runs in a conventional manner by converting a driving force of the internal combustion engine 106 mounted on the front side of the body 104 of the vehicle 102 to a force for driving the front wheels 110.

Exhaust gas from the internal combustion engine 106 is discharged to the outside by an exhaust pipe 114 provided along a substantially central longitudinal axis of the body 104 of the vehicle 102 which extends in the direction of travel from the front side to the rear side thereof. The exhaust pipe 114 includes a first exhaust pipe section 116 adjacent the internal combustion engine 106, respective second and third exhaust pipe sections 118 and 120 provided in the middle section of the exhaust pipe 114, and a fourth exhaust pipe section 122 which opens to the atmosphere at the rear of the vehicle 102. The sections 116, 118, 120 and 122 are successively connected to each other. A catalytic converter 123 is provided in the first exhaust pipe section 116, a sub-chamber 124 is provided between the second exhaust pipe section 118 and third exhaust pipe section 120, and a muffler 126 is provided between the third exhaust pipe section 120 and the fourth exhaust pipe section 122.

Mounted on the rear side of the body 104 of the vehicle 102 is a fuel tank 128 for reserving fuel to be supplied to the internal combustion engine 106. The fuel tank 128 includes a main body 130 formed as a substantially rectangular hollow body, and the tank 128 is mounted on a rear side of the body 104 of the vehicle 102 such that a longitudinal axis of the tank 128 extends in the lateral (i.e. sideward) direction of the body 104.

Figure 6:
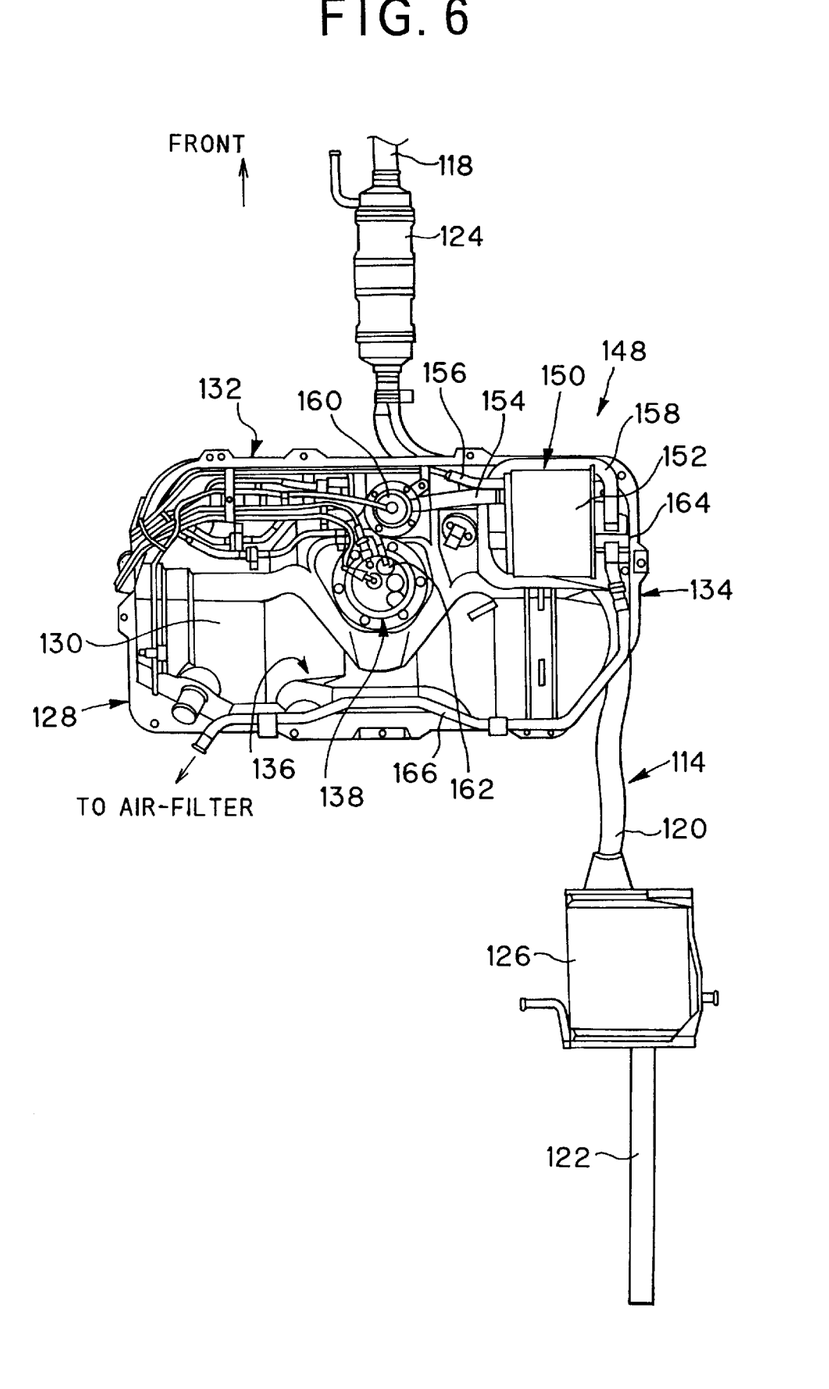
FIG. 6 is an enlarged plan view of a fuel tank and an exhaust pipe.
Figure 7:
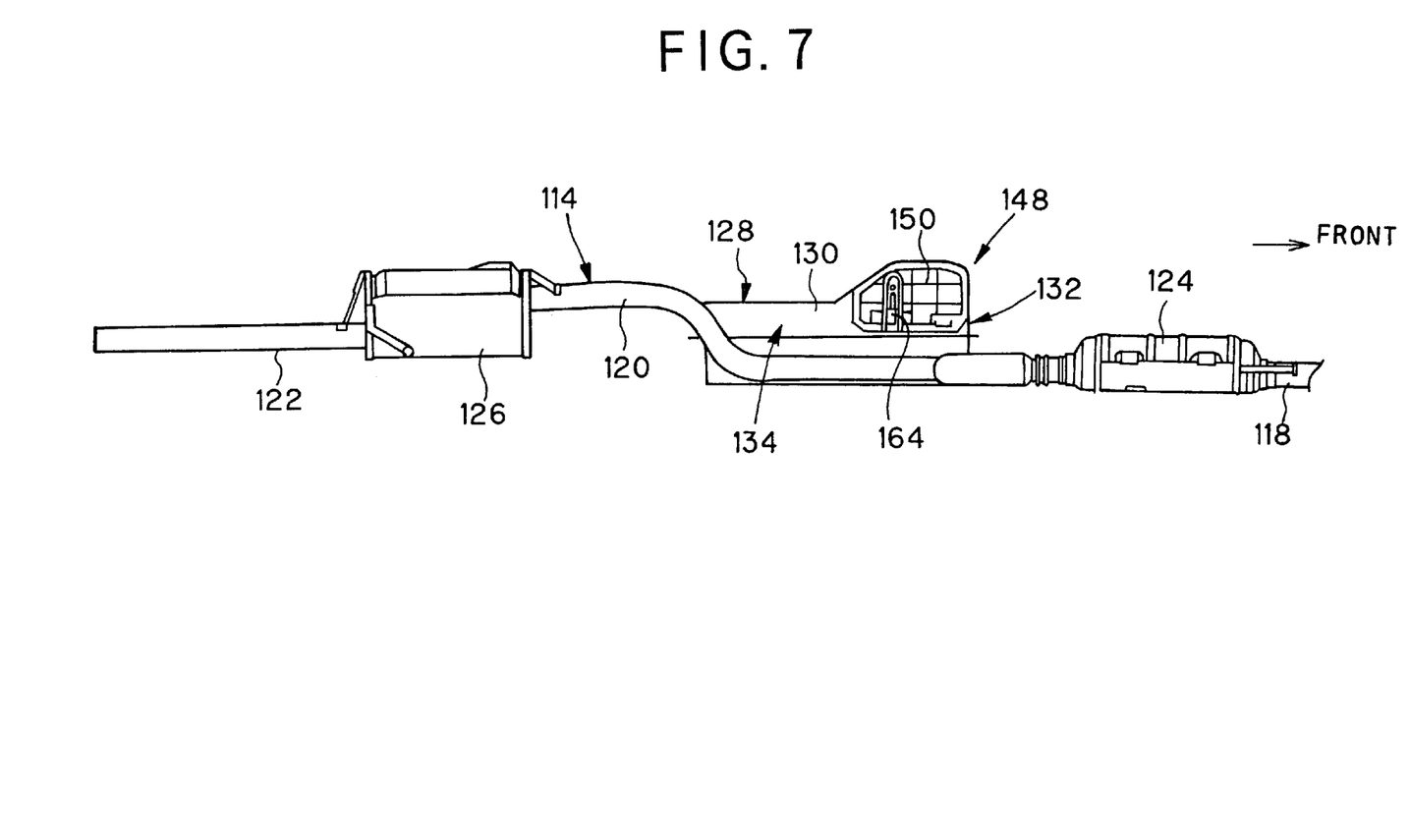
FIG. 7 is a side view of the fuel tank and exhaust pipe.

In the rear side of the body 104 where the fuel tank 128 is mounted, the exhaust pipe 114, as shown in FIG. 6 and FIG. 7, is formed by bending the midpoint of the pipe 114 into a substantially Z-shape. More specifically, the intermediate third exhaust pipe section 120 is substantially Z-shaped and extends from a substantially central point disposed adjacent the front side 132 of the main body 130 of the fuel tank 128 along or adjacent to the front side 132 of the tank 128 in the lateral or sideward direction of the body 104 of the vehicle 102. The pipe section 120 is then bent rearwardly at about a 90° angle so as to extend rearwardly along or adjacent to a side face 134 of the main body 130 of the tank 128 for connection to the muffler 126.

Figure 8:
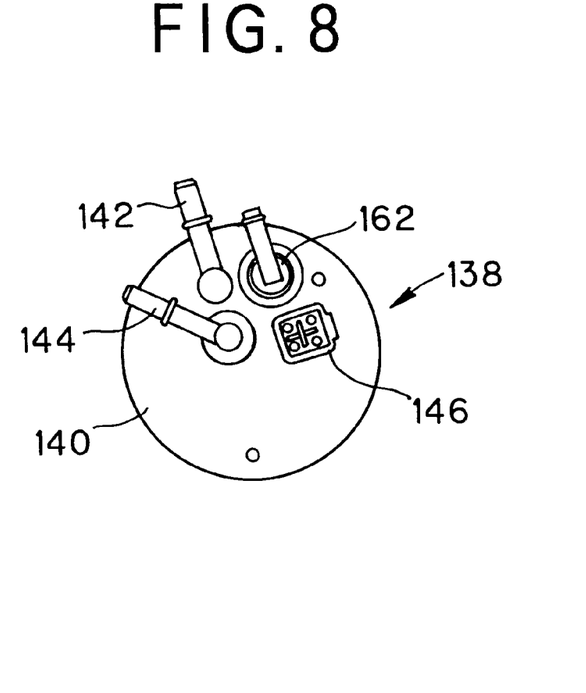
FIG. 8 is a plan view of a fuel pump.

A fuel pump 138 is provided on a top surface 136 of the main body 130 of the fuel tank 128, as shown in FIG. 6. As shown in FIG. 8, the fuel pump 138 has a pump motor (not shown in the figure) incorporated into a pump case 140. The fuel pump 138 discharges fuel from the fuel tank 128 and supplies fuel via a connecting pipe 142 to the internal combustion engine 106.

An additional connecting pipe 144 and a power coupler 146 are provided in the pump case 140. Excess fuel from the internal combustion engine 106 is returned to fuel tank 128 through the connecting pipe 144. Connected to the power coupler 146 is a power connector (not shown) for supplying power to the pump motor (not shown).

An evaporated-fuel collecting apparatus 148 is preferably connected to the internal combustion engine 106. The evaporated-fuel collecting apparatus 148 includes a canister 150 having an absorbent (not shown) incorporated in a canister case 152, to which canister case 152 one end of each of two evaporating hoses 154 and 156, a purge hose (not shown), and a hose 158 is connected. The hose 158 preferably has a portion which extends along the front side of canister 150 and a portion which extends along the right side of canister 150 and is thus bent or L-shaped. The other ends of the evaporating hoses 154 and 156 are connected to the fuel tank 128 through a vapor control valve 160 and a cut-off valve 162 respectively. The vapor control valve 160 is provided in the main body 130 of the fuel tank 128. The cut-off valve 162 is provided in the pump case 140 of the fuel pump 138. The other end of the purge hose (not shown) is connected to the internal combustion engine 106, and the other end of the hose 158 is connected to a valve 164. The valve 164 is connected by means of a pipe 166 to an air filter 167 which is open to outside air. This valve 164 is closed when fuel leakage to the evaporating passage is checked. The pipe 166 is preferably bent and extends along the right and rear side faces of the fuel tank 128.

The canister 150 absorbs evaporated fuel generated in the fuel tank 128 through the evaporating hoses 154 and 156, and supplies the absorbed evaporated fuel to the internal combustion engine 106 through the purge hose (not shown) by means of air introduced into canister 150 through the bent hose 158.

With this feature, the canister 150 collects evaporated fuel generated in the fuel tank 128 during supply of fuel when the vehicle 102 is stationary, absorbs and maintains the evaporated fuel, and also purges the absorbed and maintained evaporated-fuel during driving of the vehicle when the internal combustion engine 106 is operating and supplied the purged fuel to an air intake passage (not shown) for the internal combustion engine 106.

The evaporated-fuel collecting apparatus 148 including the canister 150 which is mounted on the fuel tank 128 is mounted on the rear side of the body 104 of the vehicle 102. The canister 150 is mounted on the top surface 136 of the main body 130 of the fuel tank 128 so that the canister is positioned close to the third exhaust pipe section 120 of the exhaust pipe 114 when the fuel tank 128 is mounted on the body 104 of the vehicle 102.

Figure 9:
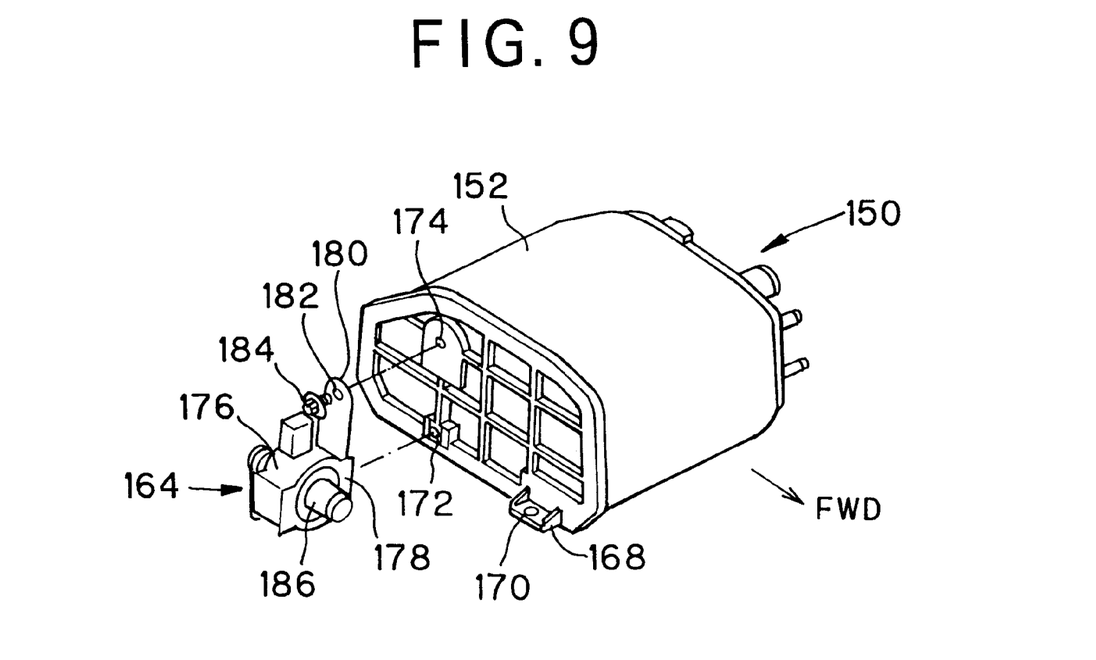
FIG. 9 is a perspective, exploded view illustrating the mounting of a valve on a canister.

The canister 150 has, as shown in FIG. 9, a tank mounting section or bracket 168 provided on and extending from the canister case 152 thereof, and a tank mounting hole 170 is provided in the tank mounting section 168. The canister 150 is mounted on the fuel tank 128 by screwing a canister-mounting bolt (not shown) which penetrates the tank-mounting hole 170 into a tank-side mounting hole (not shown) provided in the main body 130 of the fuel tank 128.

More specifically, the canister 150 is mounted on the top side 136 of the fuel tank 128 at the forward right corner thereof, so that the canister 150 is provided at a position close to the third exhaust pipe section 120, which third exhaust pipe section 120 extends from the central area of the front side 132 of the main body 130 of the fuel tank 128, along the front side 132 in the lateral direction of the fuel tank 128, and bends so as to extend rearwardly along the right side face 134 of the fuel tank 128.

Figure 10:
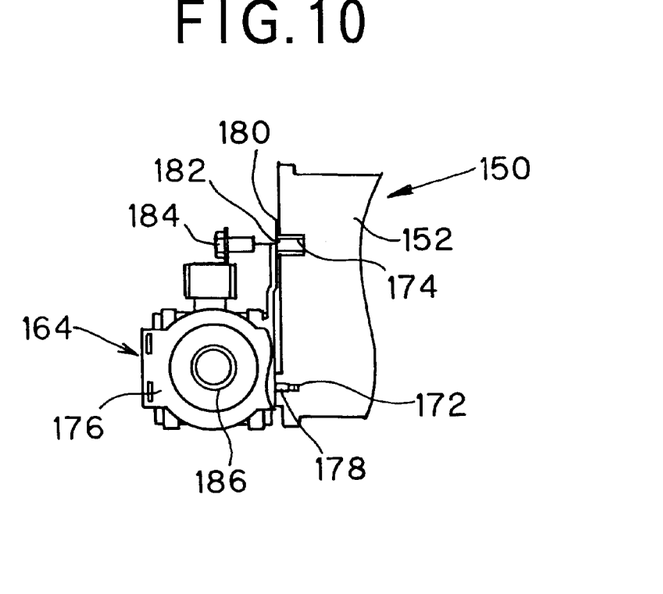
FIG. 10 is a fragmentary side view showing the canister with the valve mounted thereon.

The valve 164 of the evaporated fuel collecting apparatus 148 is mounted on canister 150 as described hereinafter. The canister 150 has, as shown in FIG. 9 and FIG. 10, valve mounting holes 172 and 174 provided in a lateral side of the canister case 152. The valve 164 has a stop section or post-like projection 178 as well as a valve-siding section or flange 182 located on a valve case 176 thereof, and a valve-side mounting hole 182 is provided in the valve-side mounting flange 180.

The valve 164 is mounted on the canister 150 by engaging or inserting the stop section 178 into the engaging hole 172 of the canister 150, aligning the valve-side mounting hole 182 with the valve mounting hole 174, and screwing a valve-mounting bolt 184 through the valve-side mounting hole 182 into the valve mounting hole 174. The stop section 178 ensures the correct rotational orientation of valve 164 on canister 150.

This feature of the invention allows the valve 164 to be positioned and mounted on the canister 150 by means of the stop section 178 and the valve mounting bolt 184 so that a connecting union or sleeve 186 of valve 164 is oriented in the proper direction for connection to the bent hose 158.

The structural and functional advantages of the invention of FIGS. 5–11 are discussed herebelow.

The evaporated-fuel collecting apparatus 148 collects evaporated fuel generated in the fuel tank 128 when the vehicle 102 is stationary, absorbs and maintains the evaporated fuel in the canister 150, and also purges the evaporated fuel absorbed and maintained in the canister 150 during driving of the vehicle when the internal combustion engine 106 is operating and supplies the purged fuel to the air intake passage (not shown) of the engine.

The evaporated-fuel collecting apparatus 148 includes the canister 150 mounted on the fuel tank 128, which fuel tank 128 is mounted on the rear side of the body 104 of the vehicle 102. The canister 150 is mounted on the top surface 136 of the main body 130 of the fuel tank 128 so that the canister 150 is provided at a position close to the third exhaust pipe section 120 of the exhaust pipe 114 when the fuel tank 128 is mounted on the body 104 of the vehicle. As such, the fuel tank 128 with the canister 150 mounted directly thereon can be mounted on the body 104 of the vehicle 102 as a unit (i.e. the canister can be mounted on the fuel tank prior to mounting the tank on the vehicle body), and for this reason it is unnecessary to discretely or individually mount the fuel tank 128 and canister 150 on the body 104 of the vehicle 102.

In accordance with the evaporated-fuel collecting apparatus mounting structure of the invention, the fuel tank 128 and canister 150 can be integrated into one unit and handled as an assembled component, so that time, steps, and number of components required for assembling the apparatus can be reduced.

The evaporated-fuel collecting apparatus 148 introduces evaporated fuel generated in the fuel tank 128 into the canister 50 when the vehicle 102 is stationary through the evaporating hoses 154 and 156 by means of the vapor control valve 160 and cut-off valve 162, respectively, and absorbs and maintains the fuel in canister 150. The evaporated-fuel collecting apparatus 148 purges the evaporated fuel absorbed and maintained in the canister 150 during driving of the vehicle when the internal combustion engine 106 is operating and supplies the purged fuel to the internal combustion engine 106, which fuel is burned therein.

During operation of the internal combustion engine 106 the canister 150 is warmed by the heat generated by the exhaust pipe 114 because the canister 150 is mounted on the top surface 136 of the main body 130 of the fuel tank 128 so as to be close to the third exhaust pipe section 120 of the exhaust pipe 114.

Figure 11:
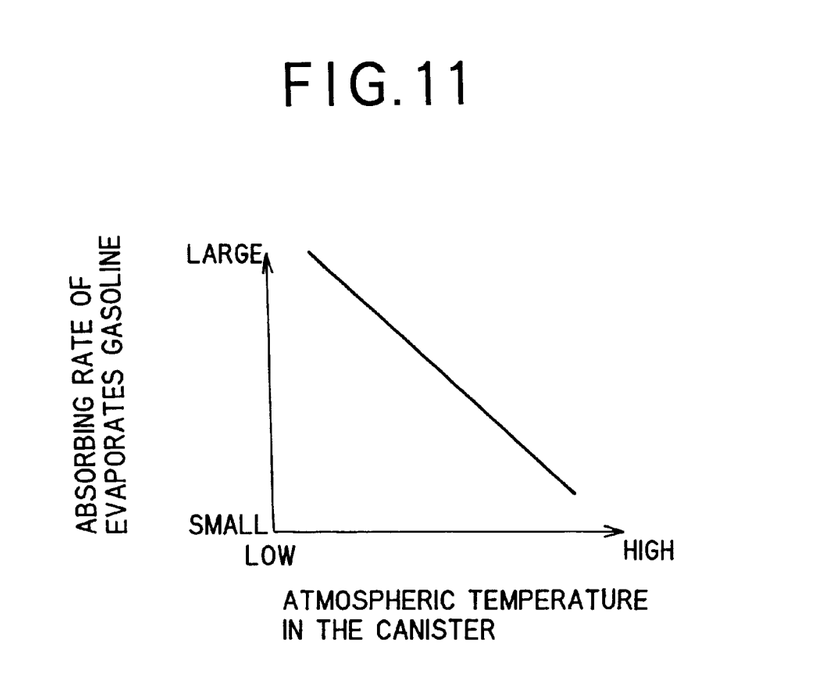
FIG. 11 shows the correlation between an atmospheric temperature in the canister and a rate of absorption of evaporated gasoline.

The canister 150 has the characteristics, as shown in FIG. 11 such that an absorption rate of evaporated gasoline decreases as atmospheric temperature increases, while the absorption rate increases as atmospheric temperature decreases. With this feature, the canister 150 easily purges evaporated fuel under higher temperature conditions. As such, it is essentially impossible for the evaporated-fuel collecting apparatus 148 to cool down due to wind or air flow generated during driving of the vehicle 102 because the canister 150 is kept warm by heat from the exhaust pipe 114 while the internal combustion engine 106 is operating and the vehicle 102 is running. Specifically, the L-shaped portion of pipe 120 effectively wraps around the right front corner of the fuel tank in close association with the canister 150 so the exhaust heat effectively warms the canister. The warmed canister 150 thus promotes purge of the absorbed and maintained evaporated-fuel therein, which allows the purge capability of the canister to be enhanced.

Further, this evaporated-fuel collecting apparatus 148 includes the canister 150 pre-mounted on the fuel tank 128, which canister 150 includes the valve 164 positioned and mounted thereon by means of the stop section 178 and valve mounting bolt 184. With this feature, the canister 150 with the valve 164 fixed thereto can be mounted on the fuel tank 128, and for this reason it is not required to discretely or individually mount the canister 150 and the valve 164 thereon. Also, the valve 164 can be mounted on the canister 150 in such a manner that the connecting union or sleeve 186 is oriented in the proper direction for connection to hose 158.

With this feature, in this evaporated-fuel collecting apparatus mounting structure, the canister 150 and valve 164 can be integrated into one unit and handled as an assembled component, and for this reason it is unnecessary to discretely or individually mount the canister 150 and valve 164 on the fuel tank 128, and also time, steps, and number of components required for assembling the apparatus can be reduced.

For the reasons as described above, the evaporated-fuel collecting apparatus mounting structure of the invention reduces time, steps, and number of components required for assembling the apparatus, improves space efficiency in a vehicle, and also easily orients the connecting sleeve 186 of valve 164 in the proper direction.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A piping device in the atmospheric side of a canister in a vehicle having side frame members extending in a longitudinal direction of the vehicle; a rear cross frame member extending in a lateral direction of the vehicle and interconnecting said side members; a fuel tank; a canister for absorbing evaporated fuel generated in said fuel tank, for purging the absorbed evaporated fuel by introduction of air thereinto, and for supplying the fuel to an engine; and an air suction pipe member connected to an atmospheric side of said canister; wherein said fuel tank and canister are provided at the rear of said vehicle, and an air suction filter for removing dust in air to be introduced into said air suction pipe member is provided further rearwardly on the vehicle than said fuel tank, said air suction pipe member is fixed to said cross member at a position close to one of said side members, and said air suction filter is fixed to said one side member.

2. The piping device according to claim 3 wherein said air suction pipe member and said air suction filter are provided remote from an exhaust system of said vehicle.

3. The piping device of claim 1 wherein said cross frame member is generally U-shaped and defines an interior space therewithin which opens upwardly, said air suction pipe member has a first end connected to said canister and a second open end mounted on a rearwardly facing side of said cross frame member and communicating with said interior space of said cross member for receiving air thereinto to purge the evaporated fuel from said canister.

4. The piping device of claim 1 wherein said air suction filter is mounted adjacent an inwardly facing side of said one side member to prevent damage of said air suction filter by road debris.

5. The piping device of claim 1 wherein said air suction pipe member has a first end connected to said canister and a second open end mounted on said cross frame member, said air suction pipe member further including a first elongate portion extending between said second end and said air filter and a second elongate portion having an end connected to said air filter and extending toward said fuel tank, each said first and second portion extending along said one side member and said first portion being disposed above said second portion.

6. A fuel evaporation system in a vehicle having an internal combustion engine and a pair of spaced-apart side frame members extending in a longitudinal direction of the vehicle and a cross frame member extending transversely between and interconnecting said side frame members, said system comprising:

a fuel tank disposed at a rear side of the vehicle and forwardly of said cross frame member;

a canister for absorbing evaporated fuel generated in said fuel tank and supplying the evaporated fuel to the engine;

an air supply pipe member having a first end connected to said canister for communication with an interior thereof and a second end open to the atmosphere for receiving air therein to purge the evaporated fuel from said canister; and an air filter incorporated into said pipe member between said first and second ends for cleaning and filtering air introduced into said canister through said pipe member, said air filter being mounted on the vehicle rearwardly from said fuel tank, said air filter being mounted on one of said side members and said second end of said pipe member being mounted to said cross frame member adjacent an intersection between said one side member and said cross member.

7. The fuel evaporation system of claim 6 wherein said cross frame member is generally U-shaped and defines an interior space therewithin which opens upwardly, said second end of said pipe member being mounted on a rearwardly facing side of said cross frame member and communicating with said interior space of said cross member for receiving air thereinto to purge the evaporated fuel from said canister.

8. The fuel evaporation system of claim 6 wherein said air filter is mounted adjacent an inwardly facing side of said one side member to prevent damage of said air filter by road debris.

9. The fuel evaporation system of claim 6 wherein said pipe member has a first elongate portion extending between said second end and said air filter and a second elongate portion having an end connected to said air filter and extending toward said fuel tank, each said first and second portion extending along said one side member and said first portion being disposed above said second portion.

10. The evaporation system of claim 6 wherein said air filter and a substantial portion of said pipe member are disposed remotely from an exhaust system of the vehicle.

11. An evaporated fuel collection apparatus in for a vehicle having an internal combustion engine, said apparatus comprising:

a fuel tank; and a canister for absorbing evaporated fuel generated in said fuel tank and supplying the evaporated fuel to an air intake passage associated with an intake system of the engine, said canister being mounted on said fuel tank such that said fuel tank and said canister form an integral unit for mounting on the vehicle, said canister being mounted on an upwardly facing surface of said fuel tank at a forward area thereof closely adjacent an exhaust pipe of the vehicle such that said canister is warmed by heat generated by the exhaust pipe during operation of the engine to enhance purge capability of said canister.

12. The evaporated fuel collection apparatus of claim 11, wherein said canister is mounted on the upwardly facing surface of the fuel tank adjacent one of the front corners thereof, and wherein said exhaust pipe includes an L-shaped pipe section which is positioned adjacent and wraps around said one front corner of the fuel tank and extends along front and side walls of the fuel tank in close proximity to said canister.

13. The evaporated fuel collection apparatus of claim 11 further including a valve mounted on said canister having an open position to permit communication between an interior portion of said canister and the atmosphere and a closed position for preventing communication between said interior portion and the atmosphere, said valve being mounted on said canister such that said valve and said canister form an integral unit for mounting on said fuel tank.

14. The evaporated-fuel collection apparatus of claim 11, wherein a valve is positioned and mounted on said canister by means of a stop section and a valve mounting bolt.

* * * * *

UNITED STATES PATENT AND TRADEMARK OFFICE
CERTIFICATE OF CORRECTION

PATENT NO : 6 105 708
DATED : August 22, 2000
INVENTOR(S) : Atsushi AMANO et al.

It is certified that error appears in the above-identified patent and that said Letters Patent are hereby corrected as shown below:

```
Column 10; line 65,   change "claim 3" to ---claim 1---.
Column 12; line 17,   delete "for".
           line 49,   change "evaporated-fuel" to ---evaporated fuel---.
```

Signed and Sealed this

Twenty-fourth Day of April, 2001

Attest:

NICHOLAS P. GODICI

*Attesting Officer*    Acting Director of the United States Patent and Trademark Office